US006496497B1

(12) United States Patent
Lee et al.

(10) Patent No.: US 6,496,497 B1
(45) Date of Patent: Dec. 17, 2002

(54) METHOD FOR MANAGING WALSH CODE CHANNELS IN MOBILE COMMUNICATION SYSTEM

(75) Inventors: Jong Il Lee, Kyongsangbuk-do (KR); Sang Hyun Cho, Kyongsangbuk-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/371,040

(22) Filed: Aug. 10, 1999

(30) Foreign Application Priority Data

Dec. 21, 1998 (KR) .............................................. 98-56599

(51) Int. Cl.[7] .............................................. F04B 7/216
(52) U.S. Cl. ...................................... 370/342; 370/441
(58) Field of Search ................................ 370/342, 441, 370/146

(56) References Cited

U.S. PATENT DOCUMENTS

2002/0037015 A1 * 3/2002 Shanbhag .................... 370/441

OTHER PUBLICATIONS

Schick, Darryl, "Creating CDMA Signal For Amplifier Testing," Microwaves & RF, Mar. 1998, pp. 127–128, 130, 132, 135, 155–156.

Schick, Darryl, "Use Peak Factor To Characterize Power Amplifiers," Microwaves & RF, Jul. 1997, pp. 54, 57–58, 60, 62, 64.

* cited by examiner

*Primary Examiner*—William Cumming
(74) *Attorney, Agent, or Firm*—Fleshner & Kim, LLP

(57) ABSTRACT

A method for managing walsh code channels in a mobile communication system includes the steps of initiating a plurality of walsh codes for the unit of sector and frequency at a base station, dividing the walsh codes allotted from the base station to a terminal in response to peak factor characteristic to put excellent walsh codes in a main queue and poor walsh codes in a sub queue, allotting with priority walsh codes which are on standby in the main queue at the base station if the terminal requests allocation of the walsh codes, and allotting walsh codes which are on standby in the sub queue if the allotted walsh codes are null or if there are no walsh codes having excellent peak factor characteristic. Accordingly, it is possible to minimize interference exerted on adjacent channels during communication, thereby improving quality of service in the overall communication system.

20 Claims, 7 Drawing Sheets

■ : combination of walsh codes having excellent peak factor characteristic
◆ : combination of walsh codes having poor peak factor characteristic FIG.1
(Related art)

■ : combination of walsh codes having excellent peak factor characteristic
◆ : combination of walsh codes having poor peak factor characteristic

METHOD FOR MANAGING WALSH CODE CHANNELS IN MOBILE COMMUNICATION SYSTEM

BACKGROUND OF THE INVENTION

1. Field of the Invention

The present invention relates to a method for managing walsh code channels allotted from a base station in a mobile communication system based on a code division multiple access (CDMA) system, and more particularly, to a method for managing walsh code channels in which excellent walsh codes are allotted with priority from a base station so as to improve quality of service.

2. Background of the Related Art

Generally, a mobile communication system based on a CDMA system spreads frequency width of a channel and gives different codes to users through this spread channel. Accordingly, the mobile communication system has an advantage that a plurality of subscribers can simultaneously use the communication system through one channel. Such a mobile communication system based on a CDMA system increases frequency capacity by 10 to 20 times as compared with a related art analog communication system and has a relatively high frequency efficiency. Furthermore, the mobile communication system can facilitate data communication and has a relatively better security as compared with other communication systems.

Figure 1:
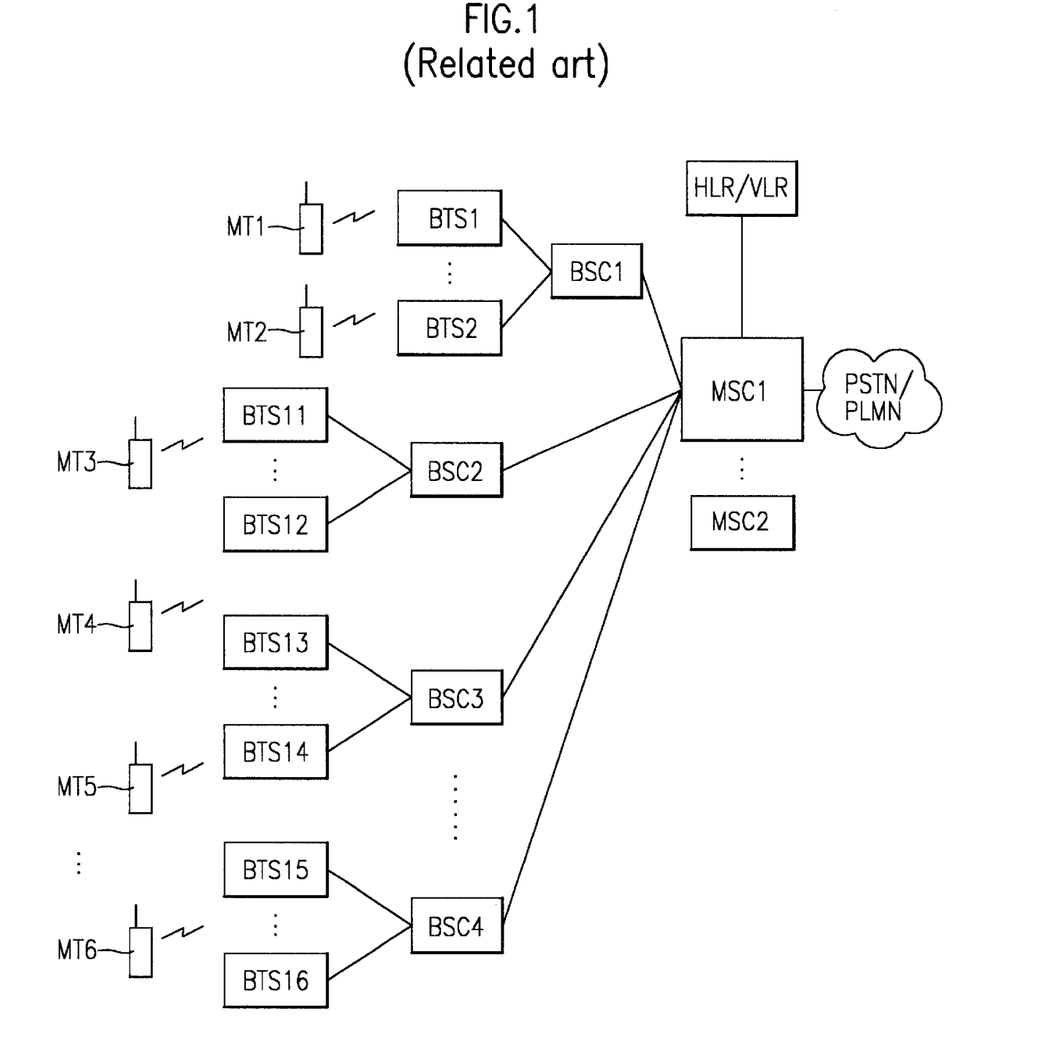
FIG. 1 is a block diagram illustrating a related art mobile communication system based on a CDMA system.

FIG. 1 is a block diagram illustrating a related art mobile communication system based on a CDMA system.

Referring to FIG. 1, a plurality of PCS/cellular terminals MT1–MTn for mobile communication are respectively connected to their base stations BTS1–BTS32 through a radio communication link. The respective base stations BTS1–BTS32 are respectively connected to a mobile switching center MSC1 through their base station controllers BSC1–BSC4. At this time, home location register/visitor location register (HLR/VLR) which manages moving location of the mobile terminals MT1–MTn is connected to the mobile switching center MSC1.

Origination operation of the respective mobile terminals in the aforementioned mobile communication system will be described below.

If the mobile terminal MT1 transmits an origination message to the base station BTS1, the base station BTS1 detects the origination message and reports contents of the origination message to the base station controller BSC1.

If it is determined that a frame-offset from the base station controller BSC1 is appropriate to be allotted to the base station BTS1, the base station controller BSC1 allots the frame-offset to the base station BSC1. If not, the base station controller BSC1 proceeds with frame-offset negotiation over maximum three times.

Subsequently, if the frame-offset negotiation has been successfully proceeded, the base station BTS1 allots a traffic channel for communication. Then, the base station allots a walsh code channel.

Subsequently, null data are transmitted from the base station BTS1 to the mobile terminal MT1.

The frequency allocation (FA), walsh codes, and the frame-offset, which are allotted from the base station BTS1, are transmitted to the mobile terminal MT1 through a paging channel. Accordingly, the base station BTS1 can temporarily synchronize with the base station controller BSC1 when the null data are transferred from the mobile terminal MT1. If the base station BSC1 synchronizes with the mobile terminal MT1, ring back tone from the switching center MSC1 is transferred to the mobile terminal MT1. Thus, origination sound occurs in the mobile terminal MT1 so that the origination call access procedures are finished.

Walsh code allocation technology for dividing channels in the mobile terminal MT1 which requests call access or handoff, at the base station BTS1 and spreading transmission data will be described in more detail.

In a CDMA system by Qualcomm in the United States, there are provided 64 different walsh codes which are respectively 64 bits. There are provided 64 channels W0,W1,W2,W3, . . . , W63 in the walsh codes. The channel W0 is used as a pilot channel which catches the location of channels and controls power when initiating the mobile terminal MT1. The channels W1–W7 are used as paging channels which inform the mobile terminal MT1 of a paging signal. The channel W32 is used as a synchronization channel which synchronizes the mobile terminal MT1 with the base station BTS1. The other 55 channels are used as traffic channels, respectively.

According to the communication system based on the CDMA system, if each mobile terminal MT1 requests call access or handoff, a channel manager provided in the base station BTS1 allots walsh codes. The channel manager allows walsh codes of 55 traffic channels W8–W31, W33–W63 to be on standby using a FIFO type queue and allots walsh codes to corresponding mobile terminals, sequentially, as occasion demands. At this time, 55 traffic channels W8–W31, W33–W63 turns on the base station BTS1 so that various processor boards load corresponding software(S/W) and are initiated when a task of each software is driven. In other words, a queue is initiated when software to the channel manager is normally operated. Thus, if a particular mobile terminal requests call access or handoff from the base station, the channel manager determines whether or not there are available walsh codes in the walsh codes which are be on standby in the queue. Subsequently, if there exist available walsh codes, the channel manager allots the walsh codes sequentially and performs call access procedures. If there do not exist available walsh codes, the channel manager informs the mobile terminal of the status of the current communication service, which is not available.

The walsh code allocation method is performed in such a manner that the walsh codes for 55 traffic channels which are sequentially initiated are sequentially allotted in the order of the first walsh code which is not allotted. In this regard, the walsh code for the traffic channel W8 is first allotted. However, if a certain time passes, it is not easy to recognize what walsh codes are allotted ahead.

Figure 2:
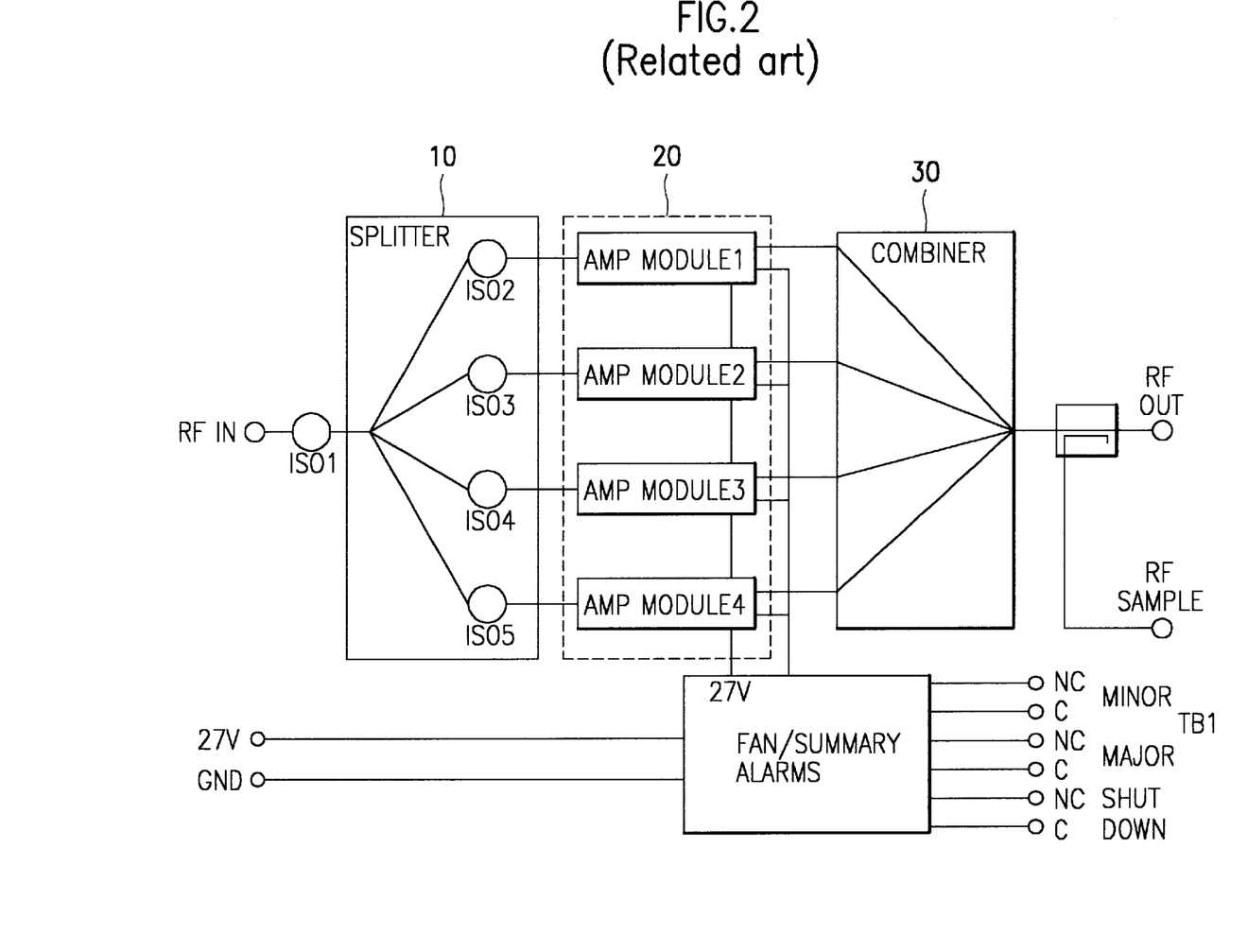
FIG. 2 is a block diagram illustrating a base station amplifier shown in FIG. 1.

As aforementioned, if the base station allots the walsh codes sequentially, the walsh code having poor peak factor characteristic may be allotted, which occurs due to unique periodicity of the walsh code. The peak factor is a parameter that expresses peak power in association with average power. If the peak factor characteristic is good, load exerted on a base station amplifier 20 shown in FIG. 2 is reduced. For example, if any system requires average power of 10 W that satisfies signal to noise ratio (SNR) and if the peak factor is expressed as 10:1, the base station amplifier should be designed to cover 100 W.

In that case, quality of service which is not relatively good is provided to the mobile terminal to which the walsh code having poor peak factor characteristic is allotted. In other words, if the peak factor characteristic is not good, large load is instaneously applied to an input terminal of the amplifier 20. For this reason, a parameter such as adjacent channel power ratio (ACPR) increases, and the range for securing linearity of an output signal is exceeded at an output terminal of the amplifier, thereby causing distortion of CDMA signal. As a result, interference between adjacent channels increases and thus it is difficult to achieve optimal quality of service.

SUMMARY OF THE INVENTION

Accordingly, the present invention is directed to a method for managing walsh code channels in a mobile communication system, that substantially obviates one or more of the problems due to limitations and disadvantages of the related art.

An object of the present invention is to provide a method for managing walsh code channels in a mobile communication system, in which a base station manages peak factor characteristic of each walsh code through one queue or two queues so that the walsh code having excellent peak factor characteristic can be allotted ahead.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for managing walsh code channels in a mobile communication system includes the steps of initiating a plurality of walsh codes for the unit of sector and frequency at a base station, dividing the walsh codes allotted from the base station to a terminal in response to peak factor characteristic to put excellent walsh codes in a main queue and poor walsh codes in a sub queue, allotting with priority walsh codes which are on standby in the main queue at the base station if the terminal requests allocation of the walsh codes, and allotting walsh codes which are on standby in the sub queue if the allotted walsh codes are null or if there are no walsh codes having excellent peak factor characteristic.

In another aspect, a method for managing walsh code channels in a mobile communication system includes the steps of identifying walsh codes having excellent peak factor characteristic and walsh codes having poor peak factor characteristic among a plurality of walsh codes allotted from a base station to a terminal to be on standby in one queue in set order, allotting walsh codes having excellent peak factor characteristic at the base station if allocation of walsh codes is required, and determining whether or not to allot walsh codes in response to peak factor characteristic of the next ordered walsh codes.

In the present invention, the base station can allot with priority walsh codes having excellent peak factor characteristic. Accordingly, it is possible to minimize interference exerted on adjacent channels during communication, thereby improving quality of service in the overall communication system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
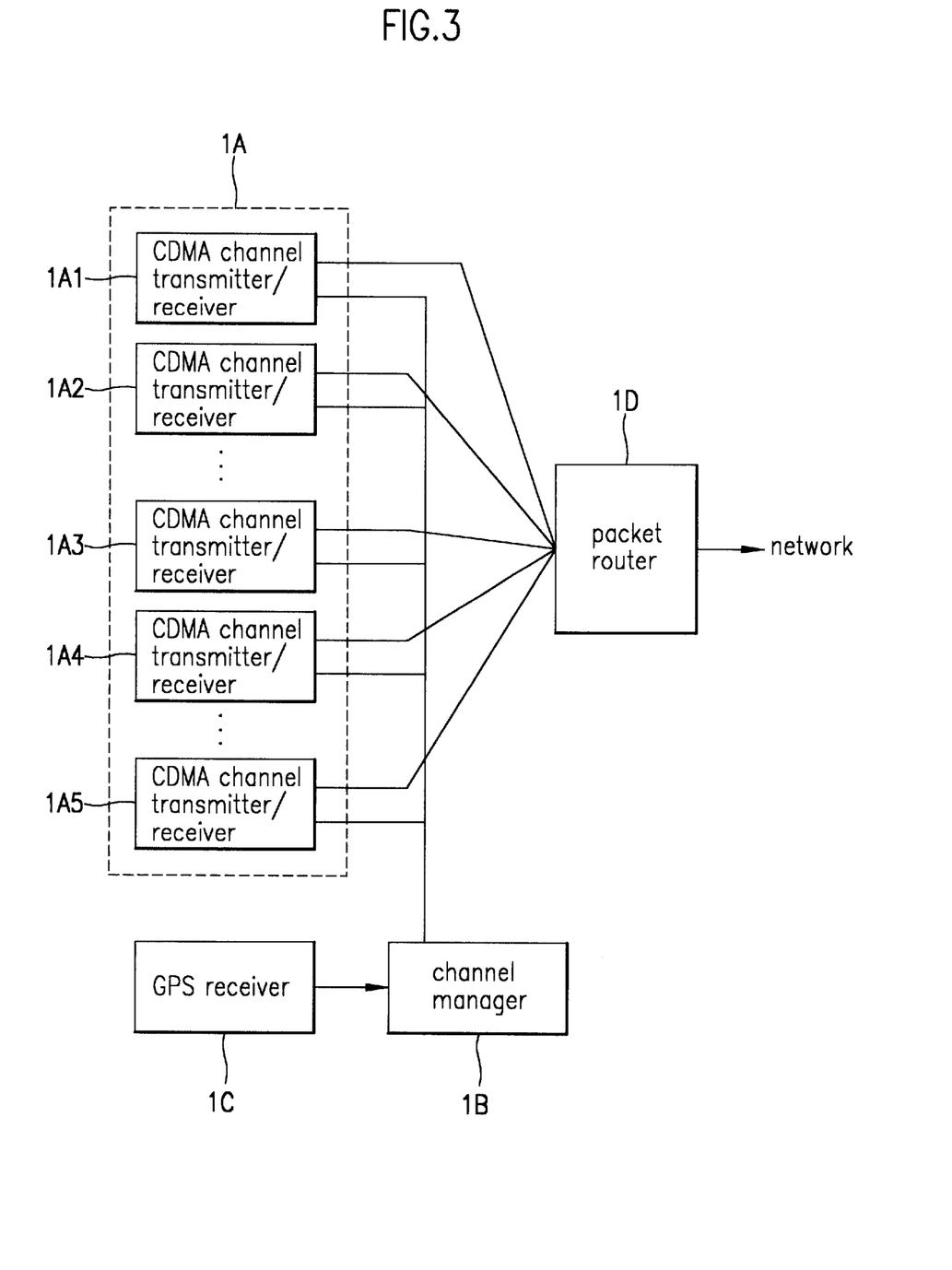
FIG. 3 is a block diagram illustrating a base station according to the present invention.

FIG. 3 is a block diagram illustrating a base station amplifier according to the present invention.

Referring to FIG. 3, a communication system of a base station according to the present invention includes a channel transmitter/receiver 1A, a channel manager 1B, a GPS receiver 1C, and a packet router 1D. The channel transmitter/receiver 1A converts a base band signal of a specific channel into an analog radio signal for radio transmission and converts an analog radio signal of a received specific channel to the base band signal. The channel manager 1B manages channels processed by the channel transmitter/receiver 1A, for example, a pilot channel, a paging channel, a synchronization channel, and a traffic channel, and controls processing of call control data received from a mobile terminal as well as call control data received from a network (system next the base station). The GPS receiver 1C receives time information essential to system synchronization from an artificial satellite and provides the time information to the channel transmitter/receiver 1A and the channel manager 1B, respectively. The packet router 1D transfers subscriber's voice packet data received from the channel transmitter/receiver 1A and call control packet data received from the channel manager 1B to the network, and transfers call control packet data received from the network to the channel transmitter/receiver 1A and the channel manager 1B. The channel transmitter/receiver 1A includes a plurality of CDMA channel transmitters/receivers 1A1–1A5.

A preferred embodiment of the present invention will be described with reference to the accompanying drawings.

The channel manager 1B turns on the system of the base station so that various processor boards initiate all of walsh codes managed by the base station when a task of corresponding software is driven. Subsequently, the channel manager 1B distinguishes between walsh codes having excellent peak factor characteristic and walsh codes having poor peak factor characteristic.

Such a method for distinguishing walsh codes can be determined by peak factor characteristic of walsh codes, obtained by experiment. Table 1 below shows the experiment results.

TABLE 1

| walsh code | peak (dB) |
| --- | --- |
| 0 | overhead |
| 1 | overhead |
| 2 | overhead |
| 3 | overhead |
| 4 | overhead |
| 5 | overhead |
| 6 | overhead |
| 7 | overhead |
| 8 | 10.05 |
| 9 | 10.01 |
| 10 | 9.32 |
| 11 | 9.28 |
| 12 | 10.00 |
| 13 | 9.70 |
| 14 | 9.26 |
| 15 | 9.18 |
| 16 | 9.99 |
| 17 | 10.08 |
| 18 | 9.38 |
| 19 | 9.36 |
| 20 | 9.61 |
| 21 | 9.88 |
| 22 | 9.22 |
| 23 | 9.09 |
| 24 | 10.03 |
| 25 | 10.02 |
| 26 | 9.29 |
| 27 | 9.37 |
| 28 | 9.67 |
| 29 | 9.80 |
| 30 | 9.17 |
| 31 | 9.02 |
| 32 | overhead |
| 33 | 10.08 |
| 34 | 9.37 |
| 35 | 9.24 |
| 36 | 9.92 |
| 37 | 9.66 |
| 38 | 9.26 |
| 39 | 8.83 |
| 40 | 10.00 |
| 41 | 10.04 |
| 42 | 9.45 |
| 43 | 9.29 |
| 44 | 9.59 |
| 45 | 9.67 |
| 46 | 9.17 |
| 47 | 9.01 |
| 48 | 9.94 |
| 49 | 10.02 |
| 50 | 9.34 |
| 51 | 9.30 |
| 52 | 9.55 |
| 53 | 9.91 |
| 54 | 9.17 |
| 55 | 9.05 |
| 56 | 9.69 |
| 57 | 10.04 |
| 58 | 9.43 |
| 59 | 9.27 |
| 60 | 9.63 |
| 61 | 9.62 |
| 62 | 9.14 |
| 63 | 9.07 |

As shown in Table 1, if four walsh codes starting from the eighth walsh code are divided into one unit, it is recognized that two walsh codes in shaded portions have higher peak factor characteristic than the other two walsh codes by about 0.4–0.19 dB. The reason why the respective walsh codes have different peak factor characteristics is that they have unique periodicity. Accordingly, it is possible to distinguish between the walsh codes having excellent peak factor characteristic and the walsh codes having poor peak factor characteristic. Subsequently, excellent walsh codes are put in the main queue and remains to be on standby, while poor walsh codes are put in the sub queue and remains to be on standby.

The walsh code standby method in the main queue and the sub queue will be described with reference to FIG. 4.

Figure 4:
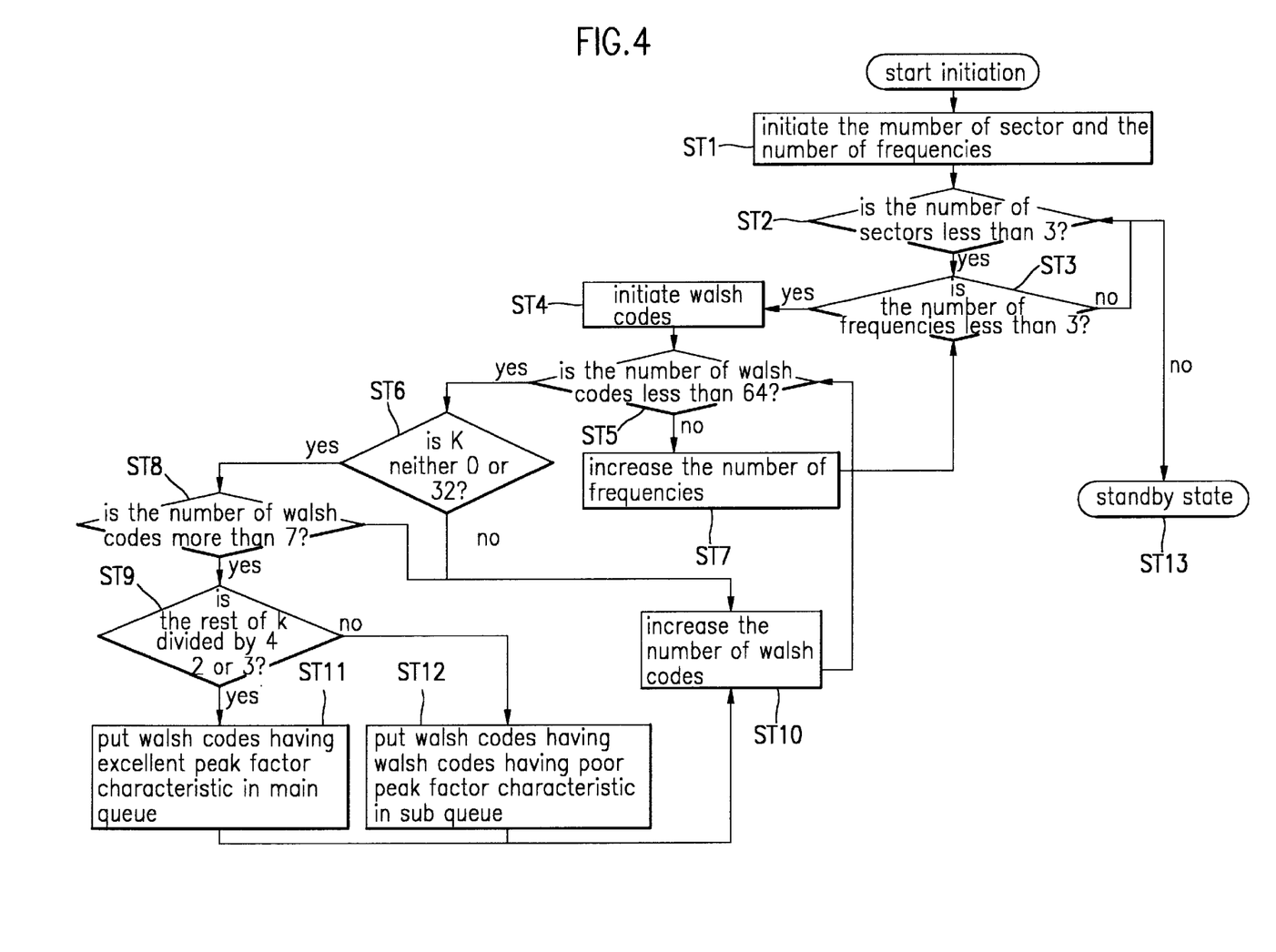
FIG. 4 is a flow chart illustrating steps of initiating walsh codes according to the present invention.

Referring to FIG. 4, i denotes the number of sectors, j denotes the number of frequencies, and k denotes the number of walsh codes. Initiating operation occurs using three sectors such as Alpha, Beta, and Gamma, when a task of corresponding software is driven. In general, total 12 commercial frequencies are allotted to communication companies. This means that the allotted frequency bands 824 MHz–835 MHz (A Band) and 845 MHz–849 MHz (B' Band) divided by 1.25 MHz are 12. Therefore, there exist 64 walsh codes in each FA and each sector.

Walsh codes for traffic channel are initiated in data structure in which 64 walsh codes are defined in a form of queue in each sector and each FA. In other words, 64 walsh codes are initiated for the unit of each sector (i=0, 1, 2) and each FA (j=0, 1, . . . , 7) (ST1–ST5). In other words, the channel manager 1B initiates count coefficient corresponding to the number of sectors (i) and the number of channel frequencies (j) (ST1) Subsequently, it is determined whether or not the number of sectors (i) is less than 3 (ST2). If the number of sectors (i) is less than 3, it is determined whether or not the number of channel frequencies is less than 8 (ST3) If the number of channel frequencies is less than 8, the number of walsh codes k is initiated (ST4). It is then determined whether or not the number of walsh codes k is less than 64 (ST5). If the number of walsh codes k is less than 64, among the 64 walsh codes, the walsh code W0 used for the pilot channel and the walsh code W32 used for the synchronization channel are omitted from the queue for traffic channel (ST6). The 7 paging channels W1, W2, . . . , W7 are then omitted from the queue for traffic channel (ST8).

Subsequently, it is determined whether the rest of the walsh codes divided by 4 is 2 or 3 (ST9). If the rest is 2 or 3, the walsh codes are put in the main queue (ST11). If the rest of the walsh codes divided by 4 is not 2 or 3, that is, if the rest of the walsh codes divided by 4 is 0 or 1, the walsh codes are put in the sub queue (ST12). The reason why the walsh codes are divided by 4 is that it is identified by experiment of peak factor characteristic of walsh codes that the rest of excellent walsh codes divided by 4 is 2 or 3.

The walsh codes having excellent peak factor characteristic are only put in the main queue. In other words, total 28 walsh codes W10, W11, W14, W15, . . . , W62, W63 are put in the main queue. By contrast, the walsh codes having poor peak factor characteristic are only put in the sub queue. In other words, total 27 walsh codes W8, W9, W12, W13, . . . , W60, W61 are put in the sub queue.

Furthermore, the sub queue has allocation priority order because power ratio of adjacent channels is reduced as compared with that the walsh codes having excellent peak characteristic and the walsh codes having poor peak characteristic are alternately allotted. In this case, it is possible to provide excellent quality of service in the overall communication system.

Figure 5:
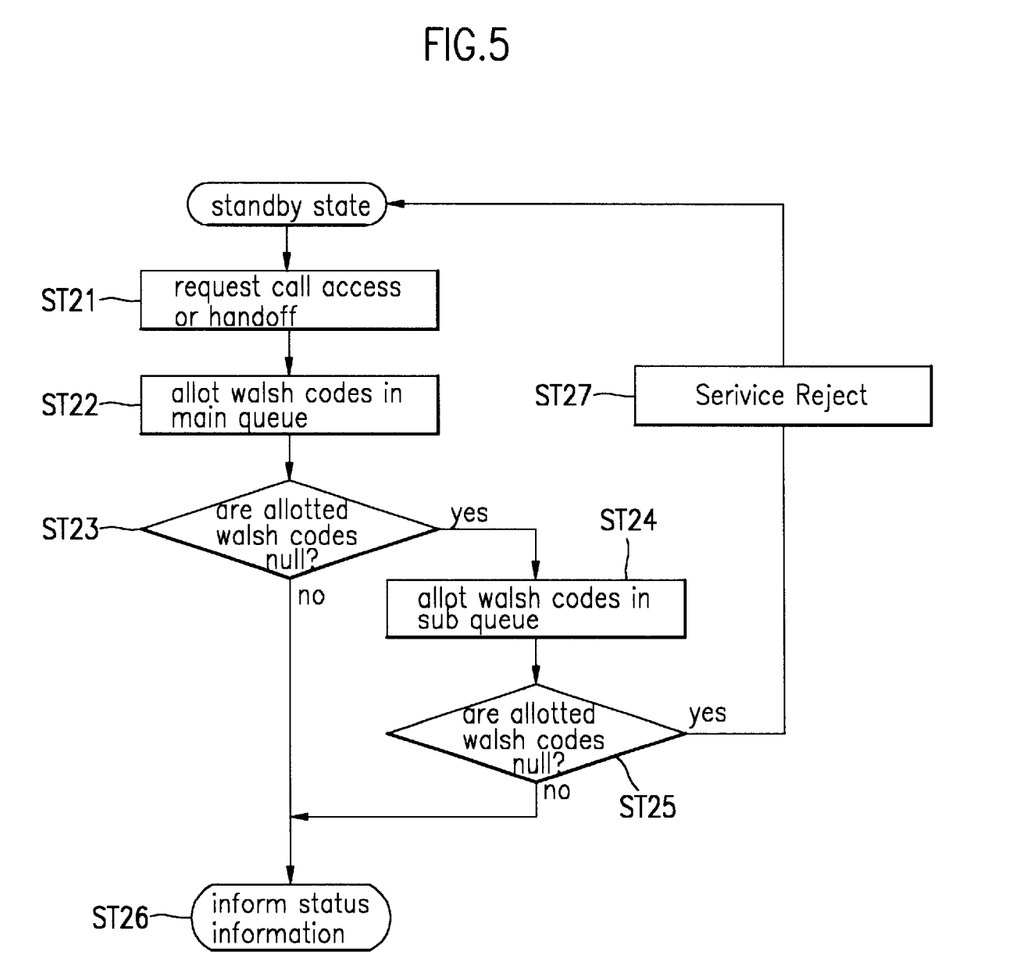
FIG. 5 is a flow chart illustrating steps of allotting walsh codes when a mobile terminal requests call access.

Under the circumstances, as shown in FIG. 5, if the mobile terminal requests call access or handoff (ST21), the channel manager 1B gives the walsh codes having excellent peak factor characteristic priority in allocation (ST22). Subsequently, the channel manager 1B determines whether or not the walsh codes allotted from the main queue are null (ST23). If the walsh codes are not null, the channel manager informs the mobile terminal or the network (communication system next the base station) of the status information (ST26). On the other hand, if the walsh codes are null, already allotted walsh codes become null and walsh codes having poor peak factor characteristic, which are on standby in a sub queue, are allotted (ST24). Subsequently, it is determined whether or not the walsh codes allotted from the sub queue codes are null (ST25). If the walsh codes are null, the channel manager 1B rejects call access service or handoff service (ST27) and is to be on standby state. If the walsh codes are not null, the channel manager informs the mobile terminal or the network of the status information (ST26).

Figure 6:
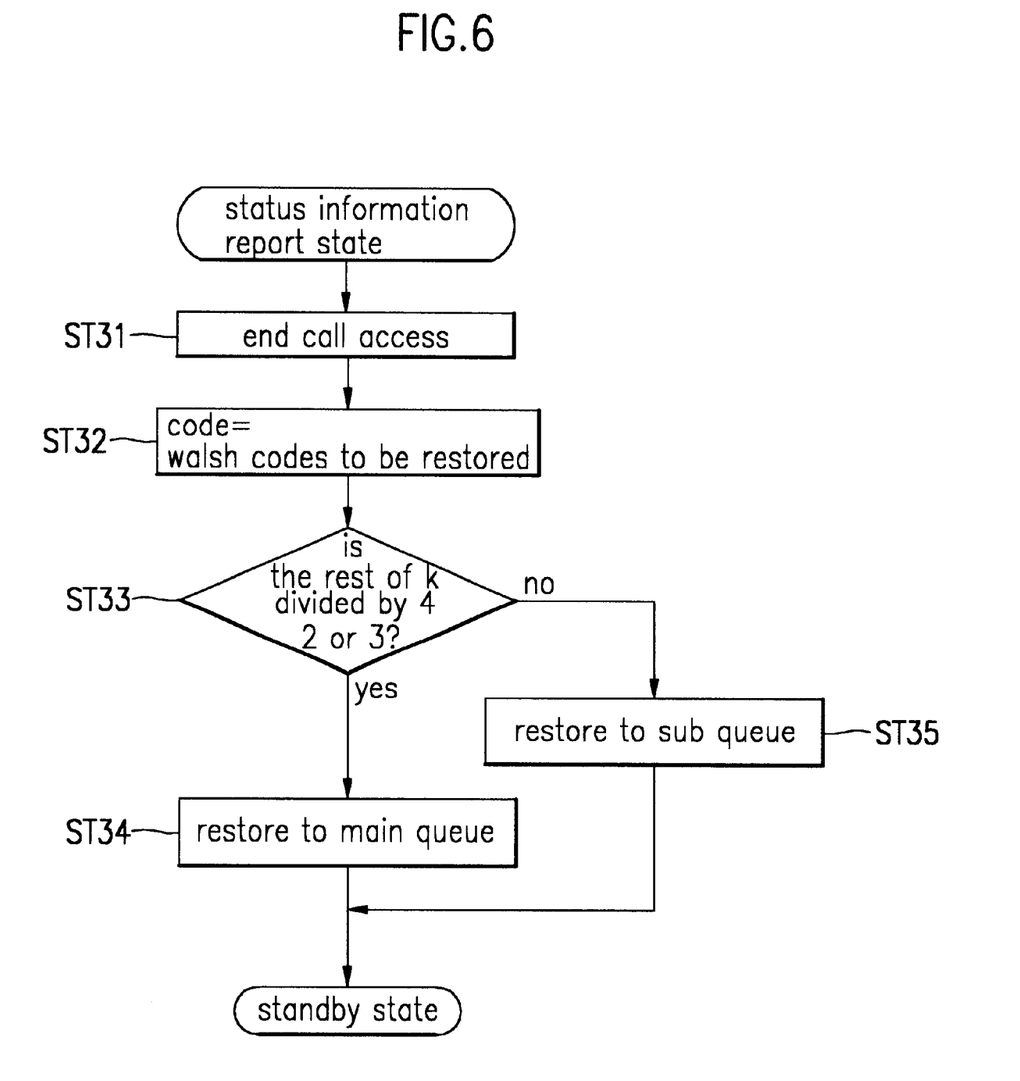
FIG. 6 is a flow chart illustrating steps of finishing call access according to the present invention.

Subsequently, as shown in FIG. 6, after the mobile terminal or the network is informed of the status information, if call access ends by completing allocation procedures of the walsh codes (ST31), the channel manager 1B sets walsh codes to be restored (ST32) and determines whether the rest of the number of walsh codes k divided by 4 is 2 or 3 (ST33). If the rest of the number of walsh codes k divided by 4 is 2 or 3, the walsh codes are restored to the main queue (ST34). If the rest of the number of walsh codes k divided by 4 is not 2 or 3, the walsh codes are restored to the sub queue (ST35).

Furthermore, if call access ends, unlike FIG. 6, the channel manager 1B of the base station can restore the walsh codes used for call access to the main or sub queue in which the walsh codes are originally on standby, in such a manner not shown in FIG. 6.

Figure 7:
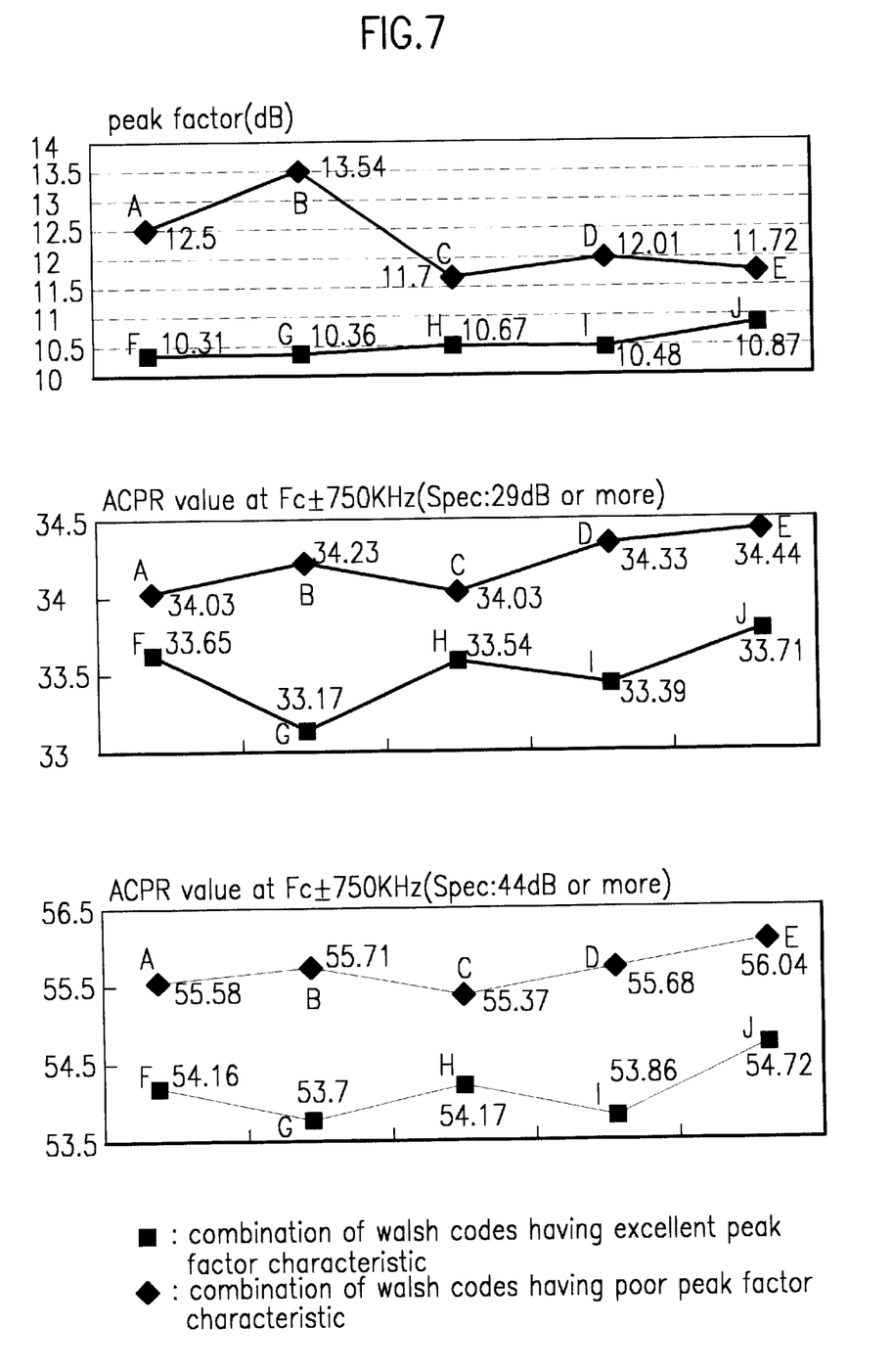
FIG. 7 is a graph illustrating power ratio of adjacent channels and peak factor characteristic by combination of six walsh codes according to an embodiment of the present invention.

FIG. 7 is a graph illustrating power ratio of adjacent channels and peak factor characteristic by combination of six walsh codes according to the embodiment of the present invention.

In FIG. 7, the experiment results are shown, in which combination of walsh codes having poor peak factor characteristic such as A(8,12,16,20,24,28), B(8,16,24,40,48,56), C(41,45,49,53,57,61), D(40,44,48,52,56,60), and E(9,13,17, 21,25,29), and combination of walsh codes having excellent peak factor characteristic such as F(54,55,58,59,62,63), G(42,43,46,47,50,51), H(22,23,26,27,30,31), I(10,11,14,15, 18,19), and J(34,35,36,37,38,39) are divided.

Referring FIG. 7, if the base station amplifier has excellent peak factor characteristic, it is recognized that power ratio of adjacent channels of the base station amplifier is small. In this case, interference exerted on the adjacent channels is reduced, thereby improving quality of service in the overall system.

Other embodiment of the present invention in which walsh codes having excellent peak factor characteristic are allotted with priority using one queue without using two queues will be described below.

The channel manager 1B initiates total 55 walsh codes for traffic channels except the walsh codes W0, W1, . . . , W7, W32 in a queue managed by the channel manager 1B.

It is assumed that i denotes the number of sectors and j denotes the number of frequencies. In this case, there are provided 8 FAs per one sector, and there are provided 55 walsh codes for traffic channels per one FA.

Subsequently, if all of walsh codes are initiated, the queue is transited to be on standby state. Among the walsh codes initiated in one queue, 28 walsh codes W10, W11, W14, W15, W62, W63 have excellent peak factor characteristic while the other 27 walsh codes W8, W9, W12, W13, . . . , W60, W61 have poor peak factor characteristic, in the same manner as the first embodiment.

Under the standby state, if a particular mobile terminal requests call access or handoff, it is compared whether or not a comparative parameter mi (initial value=0) which is indicative of the number of walsh codes per allotted sector and FA is smaller than 28. If the comparative parameter mi is smaller than 28, the walsh codes are allotted. Subsequently, if the rest of the allotted walsh codes divided by 4 is 0 or 1, the walsh codes are put in the corresponding queue. At this time, to increase efficiency in allocation of the walsh codes, the channel manager 1B increases queue pointer by two and then allots next walsh code because the rest of the next walsh code divided by 4 is 0 or 1 if the rest of the current walsh code divided by 4 is 0 or 1.

However, if the rest of the current walsh code divided by 4 is 2 or 3, the rest of the next walsh code divided by 4 is 2 or 3. Therefore, the channel manager 1B increases queue pointer by one and then allots the next walsh code. Subsequently, the rest of the allotted walsh codes divided by 4 is 2 or 3, the channel manager increases a comparative parameter mi by one and then the queue is transited to status information report state 0shown in FIG. 6.

By contrast, if the comparative parameter mi is larger than 27, the corresponding queue tries to allot the walsh codes absolutely. That is to say, if there are walsh codes in the queue, the walsh codes are directly allotted without checking the rest of the walsh codes divided by 4.

If call access or handoff ends, the comparative parameter mi is reduced by one and the corresponding walsh codes are restored to the corresponding queue and the queue is transited to be on standby state.

As aforementioned, the method for managing walsh code channels in a mobile communication system has the following advantages.

If the mobile terminal requests call access or handoff, the base station allots total 28 walsh codes, with priority, having excellent peak factor characteristic obtained by experiment. At this time, since the number of maximum call accesses per sector is less than 28, only walsh codes having excellent peak factor characteristic can always be allotted to the communication system. Therefore, 28 or less mobile terminals perform communication using only walsh codes having excellent peak characteristic. This reduces interference exerted on the adjacent channels, thereby improving quality of service in the overall communication system.

It will be apparent to those skilled in the art that various modifications and variations can be made in the method for managing walsh code channels in a mobile communication system according to the present invention without departing from the spirit or scope of the invention. Thus, it is intended that the present invention covers the modifications and variations of the invention provided they come within the scope of the appended claims and their equivalents.

What is claimed is:

1. A method for managing walsh code channels in a mobile communication system comprising the steps of:

allowing a plurality of walsh codes allotted from a base station to a terminal to be on standby in queues in order to divide the walsh codes into excellent walsh codes and poor walsh codes in response to peak factor characteristic; and allotting with priority walsh codes having excellent peak factor characteristic which are on standby in the queue at the base station if the terminal requests allocation of the walsh codes.

2. The method as claimed in claim 1, wherein the queues are at least two or more.

3. The method as claimed in claim 1, wherein the standby step includes the steps of:
initiating walsh codes for the unit of sector and frequency at the base station;
dividing the respective walsh codes into walsh codes having excellent peak factor characteristic and walsh codes having poor peak factor characteristic; and
putting the walsh codes having excellent peak factor characteristic and the walsh codes having poor peak factor characteristic in two queues, respectively.

4. The method as claimed in claim 3, wherein the initiating step includes the steps of:
initiating count coefficients for the number of sectors and the number of channel frequencies;
determining whether or not the number of sectors is less than 3;
determining whether or not the number of channel frequencies is less than 8 if the number of sectors is less than 3;
initiating the number of walsh codes if the number of channel frequencies is less than 8; and
determining whether or not the number of the walsh codes is less than 64.

5. The method as claimed in claim 4, wherein, if the number of the walsh codes is less than 64, among the 64 walsh codes, the walsh codes used for pilot channels, paging channels and traffic channels are not initiated.

6. The method as claimed in claim 3, wherein the dividing step includes the steps of determining whether or not the rest of the walsh codes divided by 4 is 2 or 3, dividing the walsh codes of which the rest is 2 or 3 into the walsh codes having excellent peak factor characteristic, and dividing the walsh codes of which the rest is not 2 or 3 into the walsh codes having poor peak factor characteristic.

7. The method as claimed in claim 1, wherein the step of allotting walsh codes includes the steps of:
allotting walsh codes, with priority, which are on standby in the queue having excellent peak factor characteristic at the base station;
allotting walsh codes in the queue having poor peak factor characteristic if the allotted walsh codes are null; and
rejecting communication service if the second allotted walsh codes are also null.

8. The method as claimed in claim 7, the allotting steps further includes the step of informing the terminal or a communication network next the base station of status information if the first or second allotted walsh codes are not null.

9. The method as claimed in claim 1, wherein the base station restores the walsh codes used for call access to the corresponding queue by determining whether or not the walsh codes have excellent peak factor characteristic if call access ends after allotting the walsh codes.

10. The method as claimed in claim 9, wherein after determining whether the rest of the walsh codes used for call access is 2 or 3, the base station determines the walsh codes having excellent peak factor characteristic if the rest is 2 or 3, while the base station determines the walsh codes having poor peak factor characteristic if the rest is not 2 or 3.

11. The method as claimed in claim 1, wherein the base station restores the walsh codes used for call access to the queue which is originally on standby if call access is released after allocation of the walsh codes.

12. The method as claimed in claim 1, wherein the walsh codes are allotted at the base station by call access request or handoff request.

13. A method for managing walsh code channels in a mobile communication system comprising the steps of:
initiating walsh codes for the unit of sector and frequency at a base station;
dividing a plurality of walsh codes allotted from the base station to a terminal in response to peak factor characteristic and putting excellent walsh codes in a main queue and poor walsh codes in a sub queue;
allotting walsh codes, with priority, which are on standby in the main queue at the base station if the terminal requests allocation of the walsh codes; and
allotting walsh codes which are on standby in the sub queue if the allotted walsh codes are null or if there are no walsh codes having excellent peak factor characteristic.

14. The method as claimed in claim 13, wherein the initiating step includes the steps of:
initiating count coefficients for the number of sectors and the number of channel frequencies;
determining whether or not the number of sectors is less than 3;
determining whether or not the number of channel frequencies is less than 8 if the number of sectors is less than 3; and
initiating the number of walsh codes if the number of channel frequencies is less than 8.

15. The method as claimed in claim 13, wherein peak factor characteristic of the walsh codes is determined in such a manner that it is determined whether the rest of the walsh codes divided by 4 is 2 or 3 and then the walsh codes of which the rest is 2 or 3 are divided into the walsh codes having excellent peak factor characteristic and the walsh codes of which the rest is not 2 or 3 are divided into the walsh codes having poor peak factor characteristic.

16. A method for managing walsh code channels in a mobile communication system comprising the steps of:
dividing a plurality of walsh codes allotted from a base station to a terminal into walsh codes having excellent peak factor characteristic and walsh codes having poor peak factor characteristic and allowing the walsh codes to be on standby in one queue in set order; and
allotting walsh codes having excellent peak factor characteristic at the base station if allocation of the walsh codes is required, and determining whether to allot walsh codes in response to peak factor characteristic of the next walsh code if the walsh codes have poor peak factor characteristic.

17. The method as claimed in claim 16, wherein peak factor characteristic of the walsh codes is determined in such a manner that it is determined whether the rest of the walsh codes divided by 4 is 0 or 1 and then the walsh codes of which the rest is 0 or 1 are divided into the walsh codes having poor peak factor characteristic and the walsh codes of which the rest is not 0 or 1 are divided into the walsh codes having excellent peak factor characteristic.

18. A method for managing walsh code channels in a mobile communication system comprising the steps of:
dividing a plurality of walsh codes allotted from a base station to a terminal into walsh codes having excellent peak factor characteristic and walsh codes having poor peak factor characteristic and allowing the walsh codes to be on standby in one queue in set order; and
comparing whether or not a comparative parameter indicative of the number of walsh codes for the unit of sector and frequency already allotted from the base station is less than the number of preset excellent walsh codes; and allotting current walsh codes which are on standby in the queue if the comparative parameter is less than the number of preset excellent walsh codes, and identifying whether or not the allotted walsh codes are null.

19. The method as claimed in claim 18, wherein the number of walsh codes having excellent peak factor characteristic is the sum of the walsh codes of which the rest of the walsh codes divided by 4 is 2 or 3, while the number of walsh codes having poor excellent peak factor characteristic is the sum of the walsh codes of which the rest of the walsh codes divided by 4 is not 2 or 3.

20. The method as claimed in claim 18, wherein the comparative parameter is reduced by one if call access or handoff is released after allotting the walsh codes and corresponding walsh codes are restored to the queue.

* * * * *